Oct. 28, 1930.  L. D. KAY  1,779,476
METHOD OF MAKING WHEELS
Filed Feb. 13, 1929
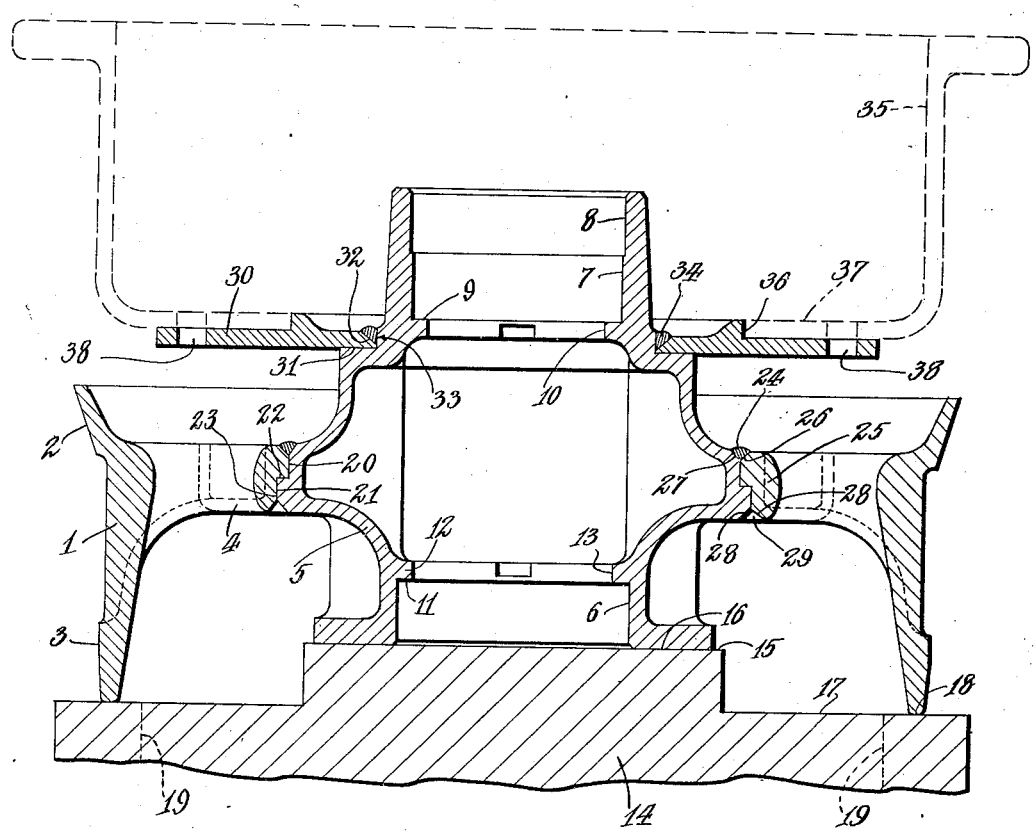
Inventor
Lloyd D. Kay
By Lyon & Lyon
Attorneys Patented Oct. 28, 1930

1,779,476

UNITED STATES PATENT OFFICE

LLOYD D. KAY, OF LOS ANGELES, CALIFORNIA, ASSIGNOR TO KAY BRUNNER STEEL PRODUCTS, INC., A CORPORATION

METHOD OF MAKING WHEELS

Application filed February 13, 1929. Serial No. 339,567.

This invention relates to the production of machine parts, and while the invention is applicable in the production of machine parts for any purpose whatever, the invention is particularly adapted for use in the production of truck wheels. In order to meet the demands of the trade and particularly cast metal wheels used for heavy trucks, it is necessary to produce wheels having different forms of hubs and different forms of felloes, and in order to supply such wheels on orders within a reasonable time, it is necessary to carry a great number of different types of wheels in stock. The general object of this invention is to provide a machine part such as a truck wheel of simple construction and which can be produced by a simple method which will enable wheels of different types of hubs and different types of felloes to be readily produced economically and in quantities.

The invention is particularly applicable in the construction of cast steel truck wheels and especially to wheels of a type in which the felloes have certain finished seat faces for seating the tire rims and which have certain finished faces on the hubs for connecting the wheels to their bearings and which faces must bear a definite relation to each other. Such wheels usually, before being placed on the truck, have a brake drum attached to them, and one of the objects of this invention is to provide a simple method for constructing such a wheel so that, although the hubs and felloes may be separately cast, their finished surfaces will bear a definite position with respect to each other in the finished wheel; also to provide a simple method for adapting the wheels to carry drums of various types.

A further object of the invention is to provide a most efficient method for producing a built-up machine element having machined surfaces in different planes bearing a definite relation to each other and to provide an effective and efficient method for producing built-up truck wheels.

Further objects of the invention will appear hereinafter.

The invention consists in the novel steps and combination of steps that constitute my novel method to be described hereinafter, all of which steps contribute to produce an efficient method of making wheels.

A preferred embodiment of the invention is described in the following specification, while the broad scope of the invention is pointed out in the appended claims.

The drawing is a vertical section through a wheel and illustrating the way in which my method may be practiced in producing a machine element of this kind. This figure represents the wheel in section and shows a supporting platen, also in section.

Before proceeding to a detailed description of my method, the relation of the present invention to the present practice in constructing truck wheels will be stated. It is the present practice to provide cast metal truck wheels with finished faces on their felloes and finished faces on their hubs, the former of which operate as seats for seating the tire rims of the wheels and the latter of which are machined to enable the hub of the wheel to be attached to a driving axle. It is the present practice to cast the hubs and felloes integral with each other and to finish the machined faces by placing the wheel on a boring mill or similar rotary machine which supports the wheel and rotates it on its own axis.

In order to economize time in the finishing of the machined faces, the cutting tool that finishes the faces at the hub of the wheel operates simultaneously with the tool that machines the face or faces on the felloe. As these tools are located at very different distances from the central axis of the wheel, it will be evident that the cutting speed of the tool operating on the felloe limits the speed of rotation of the entire wheel, although the hub finishing tool is not cutting at a speed anywhere even approximating the speed limit at which it could otherwise be employed. By practicing my invention I am enabled to finish the hubs in a different operation from the finishing of the felloes. This enables the hubs to be finished with great rapidity and on account of their relatively small diameter, they can be machined on lathes or other smaller machines which will operate at a higher speed in removing the cut metal. My invention also enables me to build up a wheel quickly and supply large quantities of wheels on a short time of delivery, with any type of rim or felloe combined with any other type of hub.

It is also the practice to provide truck wheels with brake drums and heretofore it has been necessary to provide bosses on the disc of the hub or wheel to receive bolts or studs securing the drum in place. There is considerable variation in the construction of drums and usually the wheel has to have a special design adapting it for connection to the type of brake drum that is to be used with the wheel. My invention provides for adapting a wheel of any type to carry a brake drum of any type and without necessitating any special design of the wheel and without substantially delaying the production of built-up wheels in accordance with my method.

By reason of the fact that my method enables wheels in stock to be carried in the form of felloes and separate hubs which can be readily combined in different ways into wheels by my method, the quantity of stock that must be carried may be greatly reduced. Furthermore, by reason of the fact that in accordance with my method the hubs can be finished in smaller machines by an operation separate from that of turning the felloes, considerable economy is effected in the manufacture of the wheel.

The method will now be described as applied to a truck wheel. The truck wheel may be of any desired design. The truck wheel illustrated is formed with a felloe 1 having a finished surface 2 constituting a rim seat and having another finished surface 3 constituting another rim seat. The rim seat 2 is for the inboard tire rim and the seat 3 for the outboard tire rim. This rim is most conveniently formed of cast steel and is formed with an integral extension or disc portion 4 with a central opening to receive the hub 5 of the wheel. This hub 5 may be of any suitable construction and may be provided with a finished bore 6 and an inboard finished bore 7 and counter-bore 8. The hub may also include an inboard finished shoulder 9 formed on the outer face of an internal rib with a bore 10 of reduced diameter at the rib. Similarly the outboard bore 6 may have a shoulder 11 formed on the outboard face of an internal rib 12 with a bore 13 of reduced diameter through it. In a wheel of this type the finished faces 2 and 3 of the rim or felloe must have a certain definite location, that is to say, a certain definite lateral position with respect to the shoulders 9 and 11 that determine the position of the wheel on the driving axle with respect to the central axis of the automobile.

In practicing my invention I hold the two parts, in the present instance the hub and the felloe 1, in coaxial alignment and in contact with each other and with the machined faces in the desired relation which they should have in the finished wheel. In other words, I support the felloe in a proper lateral position with respect to the hub, and while held in this position, I weld the hub and the felloe together. In the present instance I may employ a platen 14 on which the welding operation is accomplished, said platen having a true horizontal face 15 that operates as a seat for the finished end face 16 of the hub. This platen also has a true horizontal face 17 at a lower level that operates as a rest for the outboard edge 18 of the felloe. It is not essential that the platen be employed to support the felloe of the wheel because, if desired, the felloe can be supported directly on the hub by means to be described hereinafter. If it is not desired to support the felloe 1 on the platen, the sub-face 17 of the platen may terminate at about the location of the dotted lines 19. In that case the hub would be provided with a circumferential finished face 20 and a similar finished face 21 of slightly larger diameter so that an annular shoulder 22 is formed, operating as a support for a correspondingly formed opening 23 in the disc portion of the felloe 1.

With the hub and felloe held in the position indicated, I perform a welding operation as indicated by the ring 24 of welding metal on the upper side of the wheel. In order to facilitate this welding operation, the hub ring 25 of the disc portion of the wheel is formed with a beveled face 26 and a similar beveled face 27 is formed opposite to it on the outer side of the hub. These faces 26 and 27 co-operate to form a shallow channel to receive the welding metal.

Similar faces 28 are formed on the outboard side of the wheel which unite to form an annular channel 29. After the welding operation has been performed at the point 24, I weld on to the hub an adapter plate 30 that seats against an annular brake drum seating shoulder 31 that has already been formed on the hub. The adapter plate is formed with a beveled edge 32 at its central opening that operates to form an annular channel 33 to receive a ring of welding metal 34 applied in the welding operation similar to that performed at the ring 24.

The adapter plate 30 is of special construction to adapt it to receive a drum of any special construction, such as the drum indicated by the dotted lines 35. The adapter plate is preferably provided with an annular shoulder 36 that seats in the central opening of the disc 37 of the drum and the drum is afterwards secured to the adapter plate by bolts applied through bolt-holes 38.

After these two welding operations have taken place, the wheel is then turned over and held in an inverted position, and a welding operation is then performed at the channel 29.

It is evident that by reason of the shoulder 22 the hub can be made to perform the function of supporting the felloe 1 of the wheel in proper relation for the welding operation. However, in some cases it may be desired to avoid the use of the shoulder 22, in which case the central opening 20 through the rim would be a bore of uniform diameter all the way through. The hub ring 25 and this portion of the hub would be correspondingly of a uniform diameter.

It will be evident that the location of the shoulder 31 on the hub may be altered as desired to enable the hub to carry the drum in any desired relative lateral position with respect to the position of the bearing in the hub. This enables the wheel to be readily adapted for carrying drums of different types and adapts the wheel for use in trucks of different types.

It is understood that the embodiment of the invention described herein is only one of the many embodiments this invention may take, and I do not wish to be limited in the practice of the invention, nor in the claims, to the particular embodiment set forth.

What I claim is:

1. The method of producing a built-up machine element having a longitudinal axis and machined faces bearing a definite lateral position with respect to each other, and disposed apart on said longitudinal axis, which consists in forming a part of said machine element and finishing machined faces on the same, producing another part and finishing machined faces on the same, holding the said two parts in contact and fixed with their finished faces at a predetermined distance apart measured on the longitudinal axis of the element, and so that the planes of said machined faces of the two parts are in a definite relation with respect to each other, and at a distance from each other measured along the said longitudinal axis, and then welding the parts together.

2. The method of producing a built-up wheel having a hub and a felloe with a machined face on the hub and a machined face on the felloe bearing a definite relation to each other, which consists in forming the hub of the wheel and finishing the machined face or faces on the same, producing a felloe with means for engaging the hub, finishing the machined face or faces on the felloe, holding the said hub and felloe in coaxial contact with the finished face or faces on the felloe in a definite relation with respect to the finished face or faces on the hub, and welding the said hub and felloe together at their point of contact.

3. The method of producing a built-up wheel having a hub and a felloe with a machined face on the hub and a machined face on the felloe bearing a definite relation to each other, which consists in forming the hub of the wheel and finishing the machined face or faces on the same, producing a felloe with an integral disc portion for engaging the hub, finishing the face or faces of the felloe, holding said hub and felloe in contact with the finished face or faces on the felloe in a definite relation with respect to the finished face or faces on the hub, and welding the said hub and felloe together.

4. The method of producing a built-up wheel having a hub and a felloe with a machined face on the hub and a machined face on the felloe bearing a definite relation to each other, which consists in forming the hub of the wheel and finishing the machined face or faces on the same, producing a felloe with an integral disc portion having a central opening to engage the hub, finishing the machined face or faces on the felloe, holding the said hub and felloe in contact with the hub in the opening of the disc portion and with the finished face or faces on the felloe in a definite relation with respect to the finished face or faces on the hub, and welding the said hub and felloe together.

5. The method of producing a built-up wheel having a hub and a felloe with a machined face on the hub and a machined face on the felloe bearing a definite relation to each other, which consists in forming the hub of the wheel with a circumferential face and finishing the machined face or faces on the hub, producing a felloe with an integral disc portion having a central opening with a circumferential face to abut the circumferential face of the hub, finishing the machined face or faces on the felloe, holding said hub and felloe with said circumferential faces in contact, and with the finished face or faces on the felloe in a definite relation with respect to the finished face or faces on the hub, and welding the said hub and felloe together at their point of contact.

6. The method of producing a built-up wheel having a hub and a felloe with a machined face on the hub and a machined face on the felloe bearing a definite relation to each other, which consists in forming the hub of the wheel with a circumferential face with a shoulder, and finishing the machined face or faces on the hub, producing a felloe with an integral disc portion having a central opening with a circumferential face and shoulder to abut the circumferential face of the hub, finishing the machined face or faces on the felloe, holding said hub and felloe with said circumferential faces and shoulders in contact, and with the finished face or faces on the felloe in a definite relation with respect to the finished face or faces on the hub, and welding the said hub and felloe together at their point of contact.

7. The method of producing a built-up wheel having a hub and a felloe, with a machined face on the hub and a machined face on the felloe bearing a definite relation to each other, which consists in forming the hub of the wheel and finishing the machined face or faces on the same, producing a felloe with means for engaging the hub, finishing the machined face or faces on the felloe, holding the said hub and felloe with their axes coincident on a substantially vertical line and with the finished face or faces on the felloe in a definite relation with respect to the finished face or faces on the hub, and welding the said hub and felloe together on the upper side of the wheel at their point of contact.

8. The method of producing a built-up wheel having a hub and a felloe, with a machined face on the hub and a machined face on the felloe bearing a definite relation to each other, which consists in forming the hub of the wheel and finishing the machined face or faces on the same, producing a felloe with means for engaging the hub, finishing the machined face or faces of the felloe, holding the said hub and felloe with their axes coincident on a substantially vertical line and with the finished face or faces on the felloe in a definite relation with respect to the finished face or faces on the hub, welding the said hub and felloe together on the upper side of the wheel at their point of contact, turning the wheel over thereafter, and welding the felloe and hub together on the opposite side of the wheel.

9. The method of producing a built-up automobile truck wheel having a hub and a felloe with a machined face on the hub and a machine face on the felloe bearing a definite relation to each other, which consists in forming the hub of the wheel with a brake drum seating shoulder and finishing the machined face or faces on the hub, producing a felloe with means for engaging the hub, finishing the machined face or faces on the felloe, holding the said hub and felloe in coaxial contact with the finished face or faces on the felloe in a definite relation with respect to the finished face or faces on the hub, welding the said hub and felloe together at their point of contact and on the side of the felloe adjacent the said brake drum seating shoulder, producing an adapter plate capable of seating on said shoulder, placing the said adapter plate on said brake drum seating shoulder, and welding the said adapter plate to the said hub.

10. The method of producing a built-up automobile truck wheel having a hub and a felloe with a machined face on the hub and a machined face on the felloe bearing a definite relation to each other, which consists in forming the hub of the wheel with a brake drum seating shoulder and finishing the machined face or faces on the hub, producing a felloe with means for engaging the hub, finishing the machined face or faces on the felloe, holding the said hub and felloe in coaxial contact with their common axis substantially vertical, with the finished face or faces on the felloe in a definite relation with respect to the finished face or faces on the hub, welding the said hub and felloe together at their point of contact and on the side of the felloe adjacent the said brake drum seating shoulder, producing an adapter plate capable of seating on said shoulder, placing the said adapter plate on said brake drum seating shoulder, welding the said adapter plate to the said hub, turning the wheel over thereafter, and welding the hub and felloe together on the other side of the wheel.

Signed at Philadelphia, Pa., this 4th day of February, 1929.

LLOYD D. KAY.